J. Ashworth.
Shuttle Box.

N°87,616. Patented Mar. 9, 1869.

Witnesses:
Chas. A. Jordan.
Wm. C. Hibbell.

Inventor.
John Ashworth

J. Ashworth.
Shuttle Box.

No. 87,616. Patented Mar. 9, 1869.

Witnesses:
Chas. A. Jordan.
Wm. C. Hibbell

Inventor.
John Ashworth

J. Ashworth.
Shuttle Box.

N°87,616. Patented Mar. 9, 1869.

Witnesses:
Chas. H. Jordan.
Wm. C. Hibbard

Inventor.
John Ashworth

United States Patent Office.

JOHN ASHWORTH, OF NORTH ANDOVER, MASSACHUSETTS, ASSIGNOR TO GEORGE L. DAVIS, JOHN A. WILEY, AND JOSEPH M. STONE, OF SAME PLACE.

Letters Patent No. 87,616, dated March 9, 1869.

IMPROVEMENT IN LOOMS FOR OPERATING SHUTTLE-BOXES.

The Schedule referred to in these Letters Patent and making part of the same.

*To all whom it may concern:*

Be it known that I, JOHN ASHWORTH, of North Andover, in the county of Essex, and State of Massachusetts, have invented certain new and useful Improvements in Looms; and I do hereby declare that the following is a full, clear, and exact description of the same, taken in connection with the accompanying drawings, making part of this specification, in which—

Figure 1:
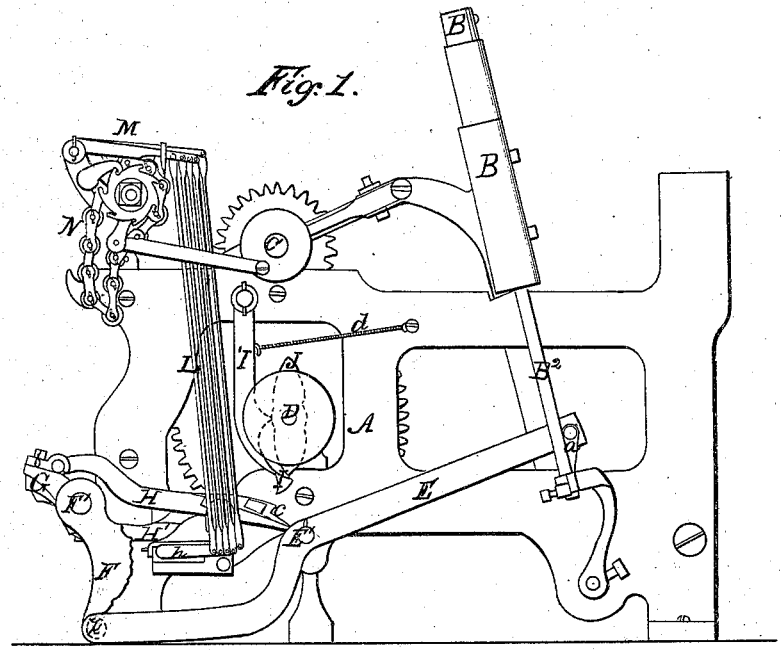
Figure 1 is a side elevation of so much of a loom as will embrace my improvements.
Figure 2:
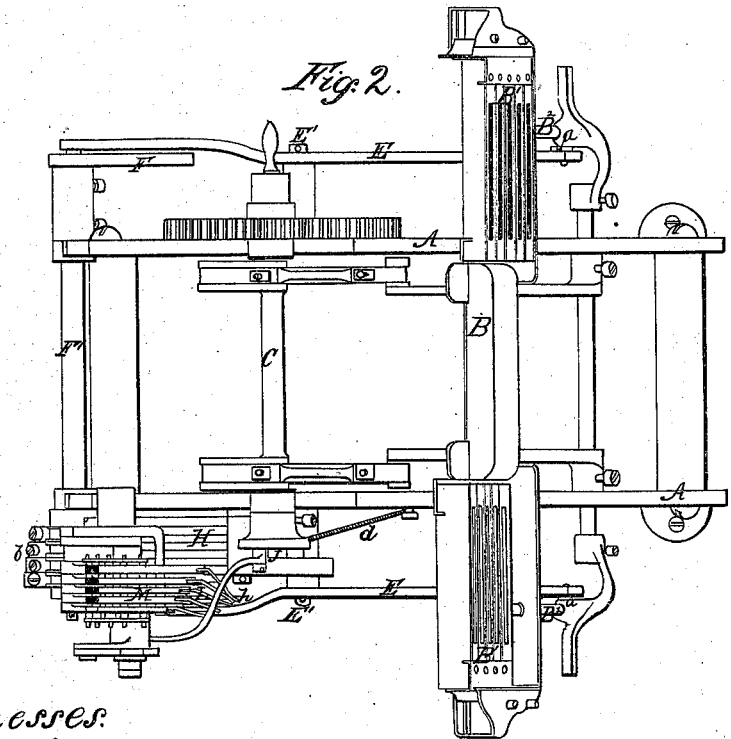
Figure 2 is a plan of the same.
Figure 3:
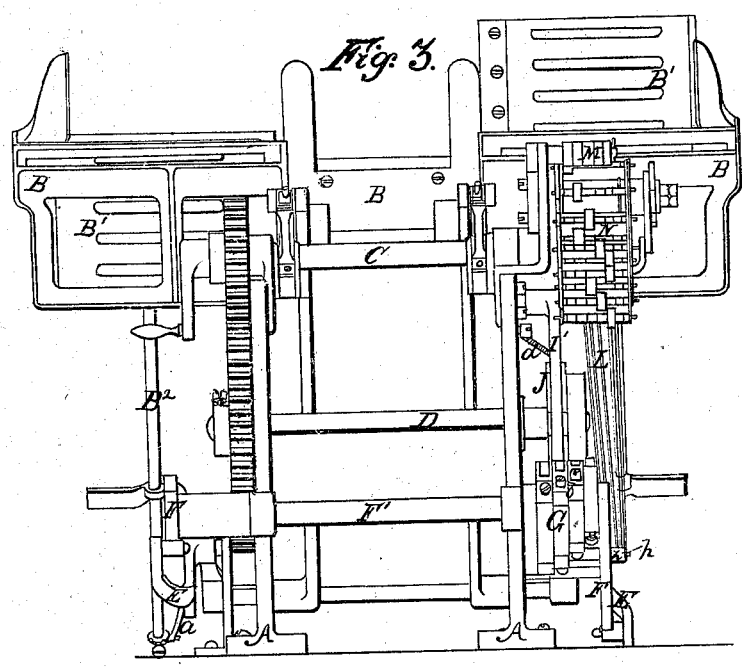
Figure 3 is a back-end elevation.
Figure 4:
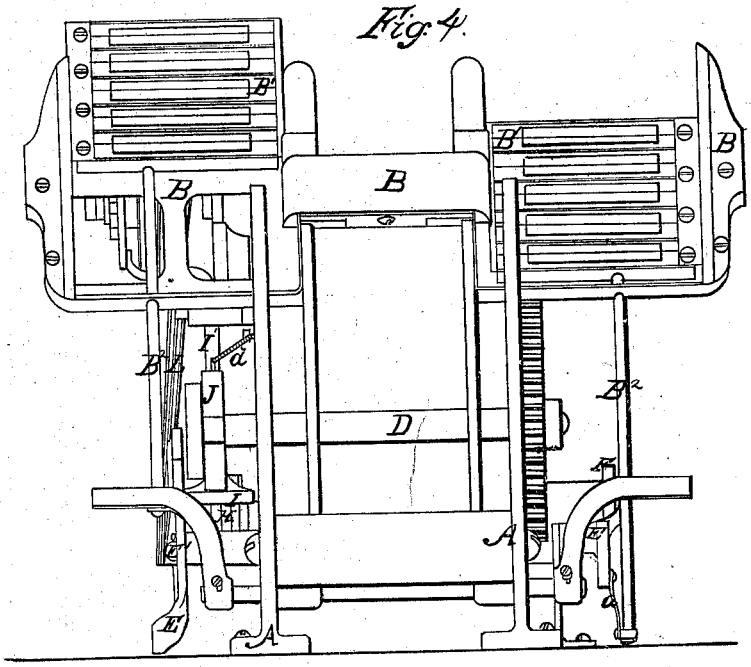
Figure 4 is a front-end elevation.

The subject-matter of my invention relates to a new method of working the drop-boxes, so called, for changing the shuttles in a power-loom for fancy weaving.

In the various methods of working the shuttle-boxes heretofore employed, the series of boxes have been placed in position by a system of cams and levers operated by a series of ratchets or catches under the control of a pattern-chain, the machinery being so arranged, that by the joint or separate action of one or more of said ratchets or catches, either in one or both directions, the levers that support the shuttle-boxes will be moved a distance, in one direction or the other, sufficient to bring that shuttle to the race which is next to be used.

In such cases it will be seen that the form or making up of the several bars of the pattern-chain has no particular relation to any one shuttle-box, but only to the distance and direction that the boxes have to be moved at any one pick of the weaving; as, for instance, in the series of five boxes shown in the drawing, the form of the chain necessary to bring the blue box to the race may be made up in either of several ways, so as to move the boxes either one, two, or three spaces in one or the other direction, according to their position at the previous pick; but by my new mechanism this relation of the pattern-chain and its levers to the shuttle-boxes is changed, and this change may be stated, in a general way, to consist in the employment of as many levers as there are boxes in the series, each lever corresponding to one of the boxes, and when it is raised by the pattern-chain, it so controls the operative mechanism as to bring its corresponding box to the race from any position whatever in the series, so that one lever only is operated at a time, and corresponds to some particular color of the weft, if a constant order of the shuttles in the boxes is maintained.

By this means great simplicity in making up the chain is attained, and the difficulty in finding the proper bar of the chain to represent any given pick is avoided, when the chain has become disarranged from the weft running out, or other causes liable to occur in weaving.

My invention, therefore, consists, in the first place, in so combining and arranging a series of shuttle-boxes and a cam, having a range of action sufficient to move the boxes from one extreme to the other, and a series of hook-rods or catches to place the said cam in position under the control of a pattern-chain, so arranged and combined that a constant relation shall be preserved between each longitudinal series of rolls, or their equivalents, of the pattern-chain and their corresponding shuttle-box, as will be hereafter described.

My invention relates, in the second place, to the construction and arrangement of the hook-rods or catches by which the cam which places the series of boxes in position is operated; and consists in the employment of two hook-rods, or their equivalents, for each intermediate shuttle-box of the series, to move the cam in opposite directions, both operating in connection with the pawl or driver, so that when the pawl or driver has arrived at the limit of its forward movement, it will be engaged with both catches, and thus bring the cam to a fixed position corresponding to some one shuttle-box from either direction, by a positive movement; and it also consists in the employment, in combination with said cam, of single hook-rods that will throw the cam to its extreme of movement in both directions, and a stop on the cam, that arrests its movement at that point, so that by the joint action of one hook-rod and the stop, the cam will be brought to a fixed position at its extremes of operation, by a positive movement.

My invention relates, in the third place, to the manner of connecting the hook-rods with the cam, so that the position of the cam and shuttle-boxes may be accurately adjusted; and consists in connecting each hook-rod with the cam by an adjustable joint, or its equivalent, arranged substantially as will be described.

In the drawings—

A is the frame of the loom; B, the lay; B¹, a series of shuttle-boxes sliding up and down in suitable guides; C is the crank-shaft; and D is the cam-shaft; all made in the usual manner.

E is a lever upon the front end of which the shuttle-boxes are supported by means of the link $a$, which connects it with the standard B², upon top of which the boxes rest.

The lever E works on a fixed fulcrum at E', and at the back end is provided with a roller which rests upon the surface of the vibrating cam F, which, by its position, determines which of the shuttle-boxes shall be brought to the race.

The cams F are mounted upon the shaft F', and are arranged, as shown in the drawings, to work a series of boxes on either side of the loom simultaneously in opposite directions, so that the boxes on one side counterbalance those on the other side. These cams vibrate through about one-fourth of a revolution, and the inclines of their surfaces are so proportioned, when rotated this distance, as to move the boxes from one extreme of the series to the other.

At those points of the cams where the roller on the lever rests, when the boxes are at rest, a small portion of the surface is made cylindrical, by which the box is accurately brought to the race, and held there firmly.

At the outer extremity of each cam F, is placed a stop, k, which, coming against the roll on the lever E, prevents the further rotation of the cam in that direction, and as the cams F are placed in reversed positions on opposite sides of the loom, their motion is thus limited by the stops in both directions.

Attached to the cams F, or their shaft F', is a series of radial arms, G, or their equivalents, arranged spirally, as shown, upon opposite sides of the shaft.

Upon their outer extremities they are provided with adjustable joint-blocks b, which form the connections with the two series of hook-rods H H', the series H being connected to the radial arms above the shaft, to move the cams in one direction, and the series, H', to the arms on the other side of the shaft, to move the cams in the opposite direction.

Each hook-rod is made with a catch at c, which, when the rod is raised, engages with the pawl, or driver I, and is carried forward by it to the end of its movement.

That part of the hook-rod beyond the catch is made lower than the other, so as to allow the driver to move back without disturbing the rod.

The driver, or pawl I, is formed upon the lower end of a pendulous lever, I', which receives a reciprocating motion from the double cam J, on the cam-shaft of the loom, and the helical spring d, in an obvious manner.

The movement of the driver I is made sufficient to move the cams F from one extreme to the other, when required, but for a less extent of movement of the cams, the driver operates upon the appropriate hook-rods for only a part of its vibration.

The blocks b are for the purpose of adjusting the position of the cams F, when brought to a rest, by lengthening or shortening the distance between the joint of the hook-rod and the driver, and they are arranged in different radial positions around the shaft, so that the line of adjustment shall correspond nearly with the line of the rods when the cams are brought to rest.

Figure 5:
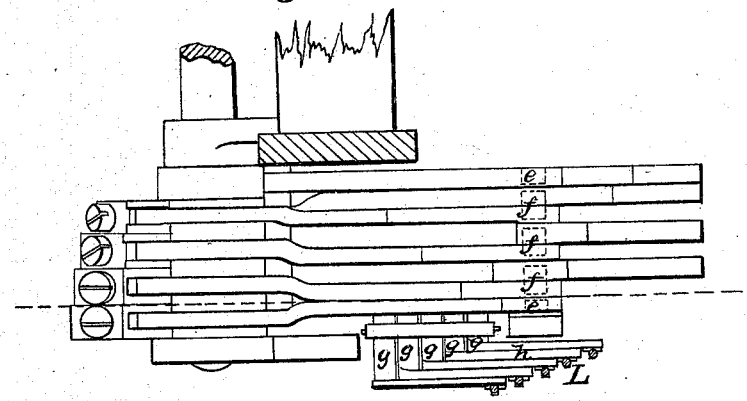
Figures 5 and 6 are details of certain detached parts, drawn to a larger scale, to show more clearly their construction.
Figure 6:
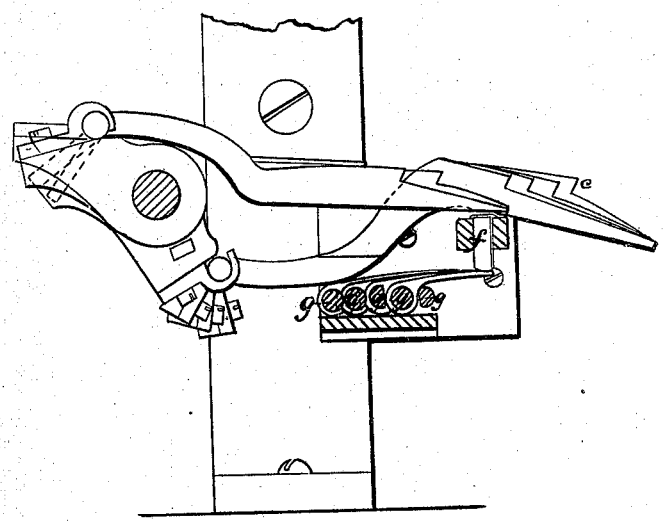

The several hook-rods rest at their free ends upon the several vertical slides e e, f f f, which rest upon the arms of the series of rock-shafts g g g g g, seen more clearly in figs. 5 and 6.

The two outside hook-rods, which carry the cams F to their extremes of movement, respectively rest upon the slides e e, but each of the intermediate slides f carries two of the hook-rods, one of the upper and one of the lower series.

To the outer end of each rock-shaft g is attached an arm, h, which, by means of one of the rods L, is connected with one of the series of levers M which work upon the pattern-chain N in the usual manner.

The pattern-chain, levers, hook-rods, and cams being thus arranged, only one of the levers is operated upon by the pattern-chain at a time, and when raised, it brings the hook-rod, or rods, controlled by it, into action with the driver I, which places the cams in a position to bring the required shuttle-box to the race.

When the driver is engaged with either of the outside hook-rods, at the limit of its forward movement, it brings the stop k on the cam F to the roll on the lever E, and this determines the position of the two outside boxes of the series; but with the other hook-rods the driver makes a part of its forward movement before it comes in contact with that rod whose catch is nearest to it, and when thus engaged, it carries the rod forward and turns the cam, and at the same time its associate hook-rod, being attached upon the opposite side of the axis of the cam, is moved toward the driver, so that they meet just at the limit of the driver's forward vibration, and thus bring the cams F to a fixed position corresponding to that position of the shuttle-boxes necessary to bring the required box to the race.

The same operation would also take place if the catch of the opposite rod were in advance or nearest to the driver, except that the movement of the cams would be in the opposite direction.

By this means each longitudinal series of rolls, or the pattern-chain, corresponds to one of the shuttle-boxes, so that the raising of any one of the levers M by the chain brings its corresponding box to the race under all circumstances. This is shown in the drawings by tinting the boxes and their levers with corresponding colors.

It is evident that the pattern-chain, hook-rods, and cams, with the other devices by means of which they co-operate, may be considerably modified in form, and other well-known substitutes, operating in substantially the same way, may be used instead of those represented.

But the construction shown, I deem the best, and have therefore given it as a complete embodiment of my new mode of operating shuttle-boxes.

What I claim as my invention, and desire to secure by Letters Patent, is—

1. The combination of a series of shuttle-boxes, a cam to place the same in position, and a duplex series of hook-rods to work said cam, operating under the control of a pattern-chain when the hook-rods are arranged substantially as described, and controlled by the pattern, so as to maintain a constant rotation between each longitudinal series of projections on the pattern and its corresponding shuttle-box, substantially as set forth.

2. The employment, in combination with the cam or cams for working the shuttle-boxes, of two hook-rods, or their equivalents, working in opposite directions, and the pawl or driver, so arranged that by their joint operations the cam will be brought to a definite and fixed position from any distance in either direction, substantially as described.

3. The employment, in combination with the cam or cams for working the shuttle-boxes, of a single hook-rod and a fixed stop attached to the cam, by the joint operation of which the cam is placed in its extreme positions, substantially as described.

4. Connecting the hook-rods with the cams by adjustable joints, substantially in the manner and for the purpose described.

Executed, April 13, 1868.

JOHN ASHWORTH.

Witnesses:
   CHAS. A. JORDAN,
   WM. C. HIBBARD.